United States Patent [19]
Buczek et al.

[11] 3,824,487
[45] July 16, 1974

[54] UNSTABLE RING LASER RESONATORS

[75] Inventors: Carl J. Buczek, Manchester; Peter P. Chenausky, Farmington; Robert J. Freiberg, South Windsor, all of Conn.

[73] Assignee: United Aircraft Corporation, East Hartford, Conn.

[22] Filed: May 8, 1972

[21] Appl. No.: 251,040

[52] U.S. Cl.................................... 331/94.5 C
[51] Int. Cl. ................................... H01s 3/08
[58] Field of Search .............................. 331/94.5

[56] References Cited
UNITED STATES PATENTS
3,622,907  11/1971  Tomlinson et al. ............... 331/94.5
3,641,458  2/1972  La Tourrette et al. ............ 331/94.5

OTHER PUBLICATIONS
Anan'Ev et al., Soviet Physics–JETP, Vol. 28, No. 1, January, 1969, pp. 69–74.

Anan'Ev et al., Soviet Physics–Tech. Physics, Vol. 14, No. 7, January, 1970, pp. 1000–1002.

*Primary Examiner*—John K. Corbin
*Assistant Examiner*—R. T. Webster
*Attorney, Agent, or Firm*—Anthony J. Criso

[57] ABSTRACT

Unstable resonator designs having totally reflecting optics which allow isolation of the parameters that control transverse mode discrimination from the parameters that control mode volume and output coupling are disclosed. Various asymmetric ring resonator geometries which include a pair of confocal curved reflecting surfaces and suitable techniques for promoting unidirectional oscillation in these geometries are discussed.

8 Claims, 5 Drawing Figures

UNSTABLE RING LASER RESONATORS

BACKGROUND OF THE INVENTION

1. Field of Invention

This invention relates to lasers and more particularly to unstable laser resonator designs which are capable of providing a high power output. The invention herein described was made in the course of or under a contract or subcontract thereunder, with the U.S. Department of the Air Force.

2. Description of the Prior Art

A great deal of the laser development to date has involved the use of what is conventionally referred to as stable resonators. In a stable resonator, a beam of collimated electromagnetic radiation is passed through a gain medium under conditions which cause a transfer of energy from the gain medium to the beam. Laser technology has developed to the point where the large amount of power must be extracted from large volume gain medium in a diffraction limited beam. The use of stable resonator geometries employing partially transmitting optics or hole coupling is practical for most low power laser applications up to approximately several kilowatts. These devices are typically used as laboratory lasers and for such applications as radar and holography. However, when higher power, large column active media are involved, stable resonator techniques are no longer adequate. The use of partially transmitting optics becomes increasingly difficult because the absorption of even a small amount of the total power being transmitted through the coupling mechanism causes severe cooling requirements. In extreme cases the optics are destroyed due to thermal heating. An alternative nontransmissive type coupling mechanism used with high power linear unstable laser devices is diffractive coupling; however, it has not been possible to produce a collimated output beam having good mode quality from a large volume of gain medium.

SUMMARY OF THE INVENTION

An object of the present invention is to efficiently couple a large amount of electromagnetic radiation from a resonator in the form of a collimated beam.

Another object of the present invention is to produce a laser beam with a resonator in which the requirements for transverse mode discrimination can be satisfied without compromising the mode volume and fractional output coupling characteristics of the resonator.

The present invention is predicated on recognizing that in a resonator the determination of mode volume, fractional output coupling and optical alignment tolerance can be made independent of transverse mode discrimination for a beam of electromagnetic radiation if the resonator is made optically unstable, and with one region for changing the cross section of the beam and another region for transferring energy to the beam. According to the present invention, an unstable resonator having a first region in which a beam of electromagnetic radiation passing therethrough is collimated and a second region in which the beam passing therethrough is noncollimated is formed with at least two curved reflection surfaces which permit the diameter of the beam to be changed within the resonator; the energy density of the collimated beam is enhanced by passing the beam through a gain medium and a portion of the enhanced beam is diffractively coupled out of the resonator as a collimated output beam in the form of a ring while the core of the beam passes between the two curved reflection surfaces where it is magnified and recycled.

A fundamental feature of the present invention is the simultaneous optimization of the transverse mode pattern of a beam within the resonator together with the mode volume and cavity stability criteria. A preferred embodiment of the present invention is an unstable asymmetric ring resonator having totally reflecting optics that provide a large fundamental mode volume, excellent transverse mode control and a collimated output beam. The perimeter of the resonator is independent of the radii of curvature of the curved reflecting surfaces. The present invention avoids the use of mirrors having long radii of curvature and consequently optical misalignment and mirror distortion are relatively insensitive. Further, the resonator can provide a magnification factor significantly greater than unity which encourages unidirectional oscillation within the oscillator and provides a large fraction of power in the central lobe of the far field pattern. Additionally, the output coupler can be located at any location on the resonator perimeter at which the internal beam is collimated.

The foregoing and other objects, features and advantages of the present invention will become more apparent in the light of the following detailed description of preferred embodiments thereof as illustrated in the accompanying drawing.

DESCRIPTION OF THE PREFERRED EMBODIMENT

The essence of the present invention involves separating the parameters which control the transverse mode discrimination in a resonator from those parameters which control the fractional output coupling and mode volume of the laser system. This separation is feasible in a resonator which is asymmetric, unstable and confocal as each of these characteristics is developed hereinafter. For the purposes of the following explanation, the perimeter or optical path within the resonator is comprised of two independent regions; in one of these regions, the laser beam passes therethrough as a collimated beam having a diameter which is governed by diffraction and in the other of these regions the laser beam passes between a pair of curved reflecting surfaces and undergoes geometric magnification. The actual magnification which occurs is a function of the relative curvature of the reflecting surfaces involved as will be explained more fully. The laser beam is amplified by the transfer of energy from the gain medium to the beam and energy is diffractively coupled from the beam in the collimated beam portion of the resonator perimeter.

The term asymmetric is used herein to mean that the optical length of the magnification region is different than the optical length of the collimated beam region; the term unstable means that geometric rays which occur inside the resonator cavity all tend to walk out of the cavity rather than to be folded back upon themselves as they would be in a stable resonator; the term confocal means that the focal points of the curved reflecting surfaces are coincident if the surfaces are aligned in a linear system.

Figure 1:
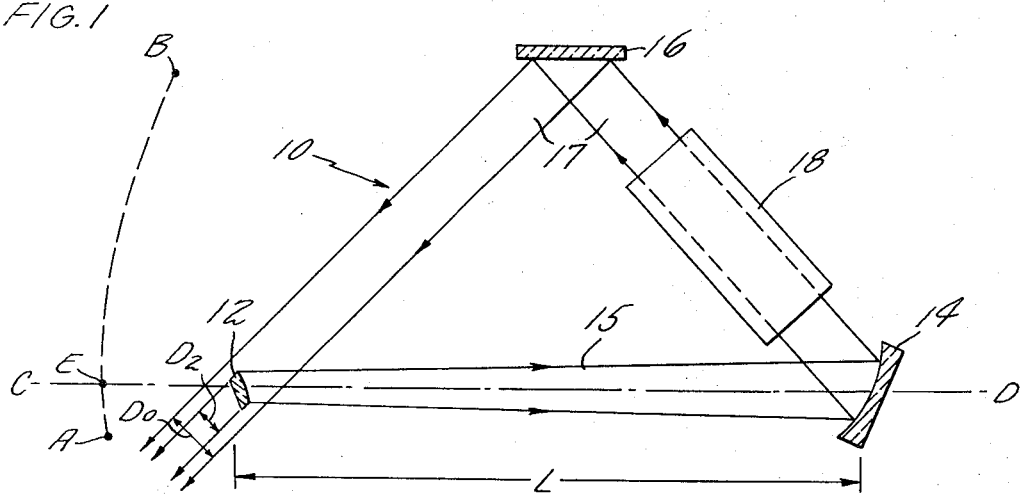
FIG. 1 is a simplified schematic diagram of an unstable asymmetric ring laser in accordance with the present invention.

A simplified unstable asymmetric ring resonator 10 is shown in FIG. 1. A convex mirror 12 having a radius of curvature $R1$ is located a distance $L$ from a concave mirror 14 having a radius of curvature $R2$ and together these mirrors define the magnification region 15 of the resonator perimeter. A fully reflecting mirror 16 having a flat reflecting surface is the third element in this simple system. The portion of the resonator perimeter between the mirrors 14, 16 and the mirrors 16, 12 forms the collimated beam region 17 of the resonator. An enclosure 18 which contains a gain medium such as excited carbon dioxide gas is located between the mirrors 14, 16.

The separation distance $L$ and the radii of curvature $R1$ and $R2$ must satisfy the relationship $$L = (R2 - R1)/2. \tag{1}$$

When this confocal requirement is met, the beam reflected by the mirror 14 and traveling in a counterclockwise direction as is shown in FIG. 1 is collimated throughout the region 17. The radii $R1$, $R2$ are centered about points A and B respectively. If the mirrors 12, 14 are turned so that their curved surfaces are symmetric about a common centerline CD, the points A, B are theoretically coincident at point E on the centerline CD; in a practical system when the points are projected onto the centerline they do not coincide exactly for the condition of beam collimation in the region 17. Further, the ratio of the radii of curvature determine the magnification factor $M$ for the resonator, according to the relationship $$M = (R_2/R_1). \tag{2}$$

Similarly, the magnification factor describes the relationship between the outer diameter $D_0$ of the annular beam which is diffractively coupled out of the resonator and the diameter $D_i$ of the hole contained in this beam; the diameter of the hole and the diameter of the portion of the beam reflected by the mirror 12 are the same.

Figure 2:
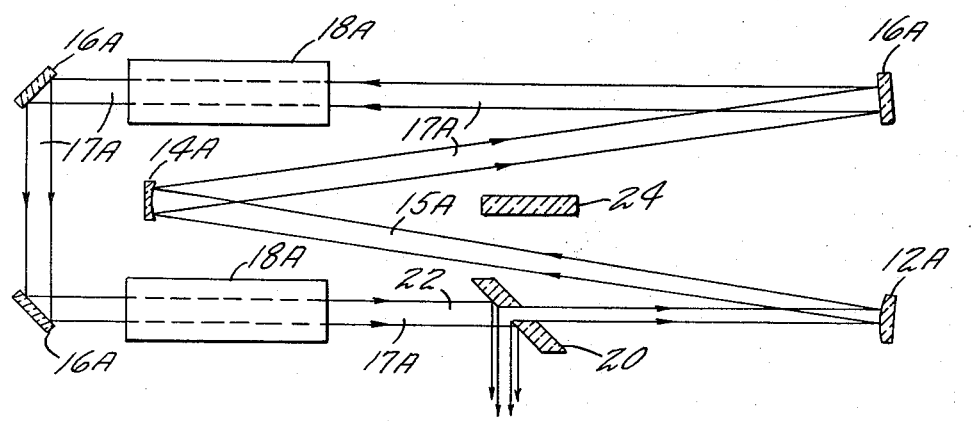
FIG. 2 is a schematic diagram of an alternate resonator embodiment using a convex/concave combination of reflecting surfaces in the magnification region and arranged to produce minimum beam distortion.

A more practical embodiment of the present invention is shown in FIG. 2. A convex mirror 12A and a concave mirror 14A having suitable radii of curvature and positioning form a pair of confocal mirrors. Three flat mirrors 16A, combine with the concave and convex mirrors to completely define the resonator. A pair of enclosures 18A containing suitable gain medium provide amplification of the laser beam passing therethrough. An output coupling mirror 20 diffractively couples the outer portion of the beam 22 from the resonator. A suppression mirror 24 is provided to produce unidirectional operation of the resonator as will be described more fully. One of the principal reasons for using the five-mirror resonator is shown in FIG. 2 rather than the basic three-mirror resonator shown in FIG. 1 is to minimize the angle of incident on the spherical mirrors 12A, 14A thereby minimizing any astigmatic distortion which might occur in the beam.

The asymmetric and confocal positioning of two curved mirrors which form an essential part of the resonator completely dissociates those parameters which allow transverse mode discrimination from the parameters which define the fractional output coupling and mode volume of the system, thereby allowing great design flexibility. The resonator perimeter has been conveniently divided into a magnification region 15A and a collimated region 17A. In the magnification region the beam undergoes a change in cross section which is determined by the ratio of the radii of curvature of the mirrors. The advantage of a resonator which has asymmetric as opposed to symmetric characteristics is immediately apparent from a simple numerical example as follows. Consider a geometrically square resonator in which each leg of the optical path is arbitrarily selected as three units and the magnification is two. When arranged symmetrically, the curved reflecting surfaces would be located at diametrically opposing corners of the square and would be separated by an optical path length (L) of six units. In order to satisfy the requirements that the cavity be confocal, (equation 1), the radius of the concave mirror would be 24 units and the radius of the convex mirror would be 12 units. Alternatively, if the resonator were arranged asymmetrically the curved reflecting surfaces would be at adjacent corners of the square and separated by an optical path length of three units. With the magnification region being three units in length and the collimated region being nine units in length, a confocal resonator results with a concave mirror radius of 12 units and a convex mirror radius of six units, exactly half the radius for the symmetric resonator of the same perimeter. Mirrors having long radii of curvature are difficult to manufacture with precision and they impose relatively severe alignment requirements when used in a resonator. Therefore any technique which allows the use of curved mirrors with reduced curvature facilitates the construction and operation of a resonator.

Figure 3:
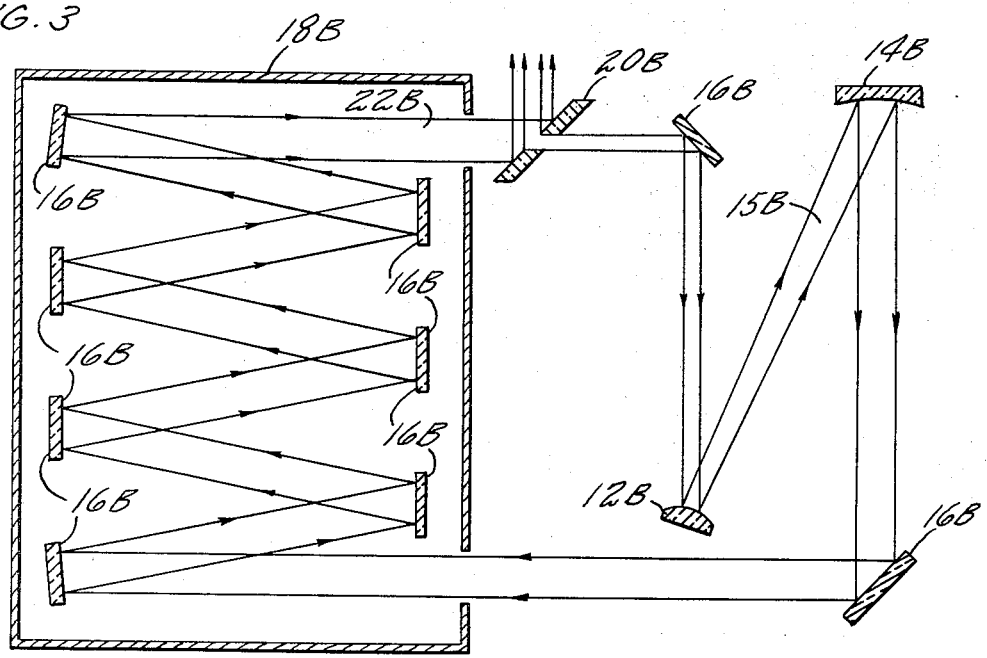
FIG. 3 is a schematic diagram of a ring resonator having a multi-path amplifier in the collimated beam portion of the resonator.

An alternate embodiment of an unstable ring laser including an eight-pass amplifier is shown in FIG. 3. A convex reflecting surface 12B and a concave reflecting surface 14B define a magnification region 15B and nine individual flat reflecting surfaces 16B positioned as shown complete the resonator. An enclosure 18B provides a suitable gain medium for amplification of the beam 22B which passes therethrough. A flat annular reflecting mirror 20B diffractively couples a portion of the beam out of the resonator. The term diffractive coupling is used to mean that some fraction of the energy is removed from the outer edges of the beam and provides an output beam that is doughnut-like in cross section having a void that contains no energy at the center if viewed in the extreme near field. This form of coupling is contrasted to the form of removing energy from a resonator with partially transmitting optics whereby energy is removed more or less uniformly across the cross section of the beam.

An obvious alternative to the folded path unstable resonator shown in FIG. 3, might appear to be a linear unstable resonator in which the mode volume is expanded to be consistent with the volume of the active gain medium. This effect can be brought about by increasing the radius of curvature of the curved mirrors. However, such resonators invariably have a high Fresnel number which suggests that discrimination in all the possible transverse modes is relatively difficult. More specifically, as long as the Fresnel number of a cavity is kept relatively low to a value of about one-half, only the lowest order mode of a cavity will have the lowest loss; alternatively, if the Fresnel number is allowed to increase to values of approximately two or greater, several modes can exist with nearly equal loss and this makes transverse mode discrimination more difficult. The equivalent Fresnel number $N_E$ is defined as $$N_E = N(M-1/2M^2) \quad (3)$$

in which the Fresnel number $N$ is defined as $$N = (D_0^2/4L\lambda), \quad (4)$$

where
$\lambda$ is the wavelength of the radiation under consideration.

Unidirectional oscillation of the unstable ring laser described can be achieved in several different ways. A simple technique is to axially flow the active medium. The cavity resonance can be tuned such that it falls near the center of the Doppler shifted gain associated with the desired direction of operation. If the system has no net flow along the optical axis or uses sealed off tubes, a directional anisotropy is introduced by placing an aligned external reflector such as the mirror 24 shown in FIG. 2 in one of the directional paths. The reflector produces a nonreciprocal coupling between the clockwise and the counterclockwise waves. In the case of a homogeneous gain medium such as carbon dioxide, the oscillation in the undesired direction is suppressed. Either of these methods is suitable for an unstable resonator in which the magnification is approximately one.

Figure 4:
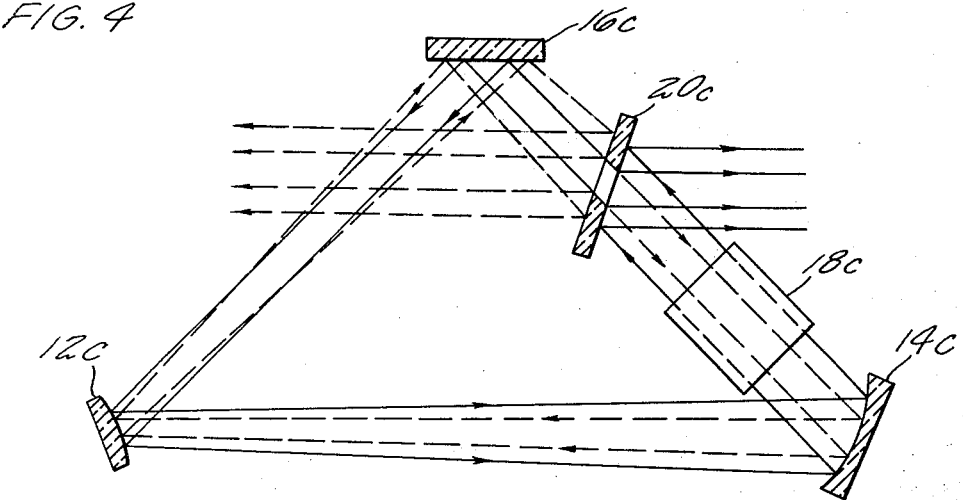
FIG. 4 is a schematic diagram illustrating the forward and reverse traveling modes in an asymmetric unstable ring resonator.

If the magnification is sufficiently greater than one, the mode volume in the clockwise and counterclockwise directions is different due to the magnification or focusing effect which occurs depending upon the direction the beam takes through the magnification region, as can be explained more fully with reference to FIG. 4. A convex reflecting surface 12C and a concave reflecting surface 14C define the magnification region and a flat reflecting surface 16C completes the resonator. An enclosure 18C containing a suitable gain medium and an output coupling mirror 20C complete this simple system. In operation the forward traveling mode represented by the solid lines is magnified in traveling from the mirror 12C to the mirror 14C. The forward traveling mode enters the enclosure 18C as a collimated beam and completely fills the volume containing an active gain medium. Energy is transferred from the gain medium to the collimated beam which is thereby intensified. An outer ring of the beam is diffractively coupled out of the resonator by the mirror 20C and the core of the beam continues on around the ring intercepting the mirror 16C and the mirror 12C. The mode in this portion of the resonator is smaller than the mode after magnification but before diffraction; the mode is also somewhat divergent due to diffraction because of the small diameter as is indicated in the figure. When the beam is reflected by the mirror 12C it is again magnified between the confocal mirrors 12C and 14C and the cycle repeats. The reverse traveling mode represented by the dashed line passes through the aperture in the coupling mirror and enters the enclosure containing the active gain medium with a beam diameter which is much smaller than the total mode volume. The ratio of the forward to reverse mode volumes is, in the absence of diffraction, the square of the resonator magnification. In propagating between the concave mirror and the convex mirror, the reverse traveling mode is focused and is not truly collimated but undergoes diffraction as it propagates from the convex mirror to the flat mirror 16C due essentially to its relatively small diameter. Power is extracted from the reverse direction from the backside of the mirror 20C.

The significant characteristic of the unstable resonator which makes unidirectional operation possible is that the forward traveling mode sees all and considerably more of the active gain medium than does the reverse traveling mode. Consequently, if the gain medium is homogeneously saturable, the forward traveling mode can quench all oscillation in the reverse direction. This phenomenon was demonstrated with a carbon dioxide gain medium in an asymmetric confocal unstable resonator having a 2.125 meter perimeter, a magnification of two, $g_1 = 3/4$, $g_2 = 3/2$ and an annular coupling mirror with a 12.7 millimeter inside diameter.

Figure 5:
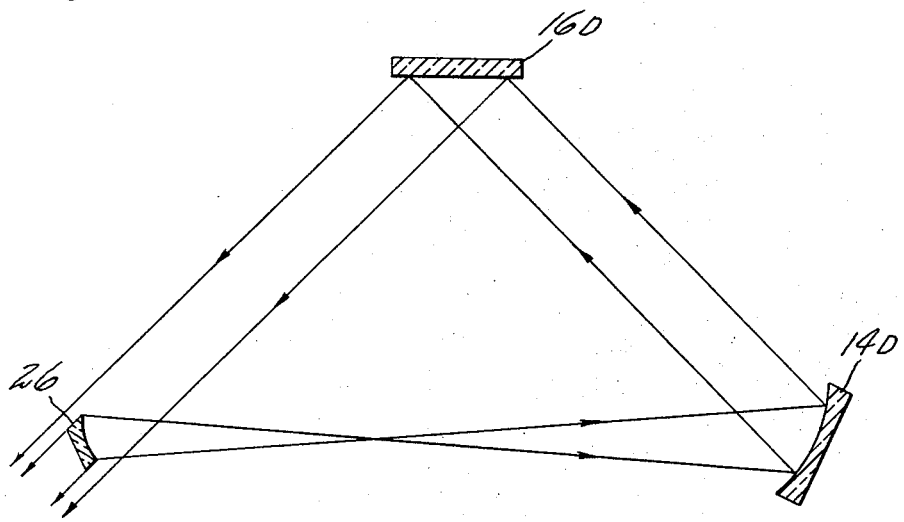
FIG. 5 is a schematic diagram of an alternative resonator in which each of the two curved reflecting surfaces are concave.

An alternate confocal unstable resonator is shown in FIG. 5. The resonator is comprised of a concave reflecting surface 14D, a flat reflecting surface 16D and a second concave reflecting surface 26. The distinction between the concave-concave resonator shown in FIG. 5 and the previously described concave-convex resonator is that an internal focus occurs in the system shown in FIG. 5. For high power devices this internal focus may cause breakdown of the medium at the point where the focus occurs resulting in nonlinear optic effects within the cavity. However, the system does have the advantage of allowing the use of mirrors having a shorter radius of curvature with the concomitant advantages of ease of construction and alignment.

Although the invention has been shown and described with respect to preferred embodiments thereof, it should be understood by those skilled in the art that the foregoing and various other changes and omissions in the form and detail thereof may be made therein without departing from the spirit and the scope of the invention.

Having thus described typical embodiments of our invention, that which we claim as new and desire to secure by Letters Patent of the United States is:

1. Apparatus for producing a collimated beam of electromagnetic radiation having an annular distribution in the near field comprising:
   reflecting means which define an unstable asymmetric, confocal, ring resonator including means for producing electromagnetic radiation which passes through the resonator as a beam along a path defined by the ring, the resonator comprising in a first region means for changing the diameter of the beam and in a second region means for collimating the beam of changed diameter; and means other than the reflection means disposed in the second region of the resonator to diffractively couple a fraction of the beam out of the resonator as a collimated beam having an annular distribution.

2. Apparatus for producing a collimated laser beam having an annular distribution in the near field comprising:

reflecting means which define an unstable asymmetric ring resonator;

means disposed in the resonator to support stimulated emission of electromagnetic radiation and to provide an internal beam of coherent energy within the resonator; and means disposed in the resonator to diffractively couple energy contained in the outer edge of the internal beam out of the resonator as a laser beam having an annular cross section.

3. The invention according to claim 2 in which the unstable resonator comprises:

a first region through which the internal beam passes as a collimated beam; and a second region through which the internal beam passes as a non-collimated beam and in which the cross sectional area of the internal beam changes while passing therethrough.

4. The invention according to claim 3 in which the length of the first region is greater than the length of the second region.

5. The invention according to claim 3 in which the reflecting optical means includes a pair of confocal curved reflecting surfaces.

6. The invention according to claim 5 in which the confocal reflecting surfaces comprise a concave surface and a convex surface.

7. The invention according to claim 5 in which the confocal reflecting surfaces are concave.

8. Invention according to claim 1 including further reflecting means disposed external to the resonator and aligned with respect to the diffractive coupling means to reflect back into the resonator along the path of the beam, energy produced in the resonator which strikes the external reflecting means.

* * * * *